No. 719,207. PATENTED JAN. 27, 1903.
C. H. GAGE.
PROCESS OF TREATING ARGILLACEOUS AND ALKALINE ORES.
APPLICATION FILED OCT. 29, 1901.
NO MODEL.
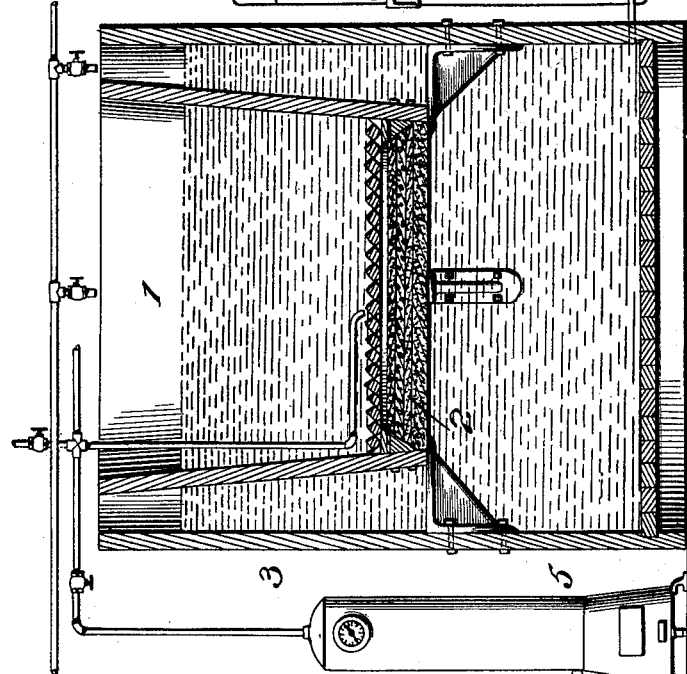
Witnesses
Inventor
Charles H. Gage
By
Attorney

UNITED STATES PATENT OFFICE.

CHARLES H. GAGE, OF DENVER, COLORADO, ASSIGNOR TO JESSE E. KREPPS, OF PITTSBURG, PENNSYLVANIA.

PROCESS OF TREATING ARGILLACEOUS AND ALKALINE ORES.

SPECIFICATION forming part of Letters Patent No. 719,207, dated January 27, 1903.

Application filed October 29, 1901. Serial No. 80,432. (No specimens.)

*To all whom it may concern:*

Be it known that I, CHARLES H. GAGE, of Denver, in the county of Arapahoe and State of Colorado, have invented certain new and useful Improvements in Processes of Treating Argillaceous and Alkaline Ores; and I do hereby declare the following to be a full, clear, and exact description of the invention, such as will enable others skilled in the art to which it appertains to make and use the same.

The object of this invention is to provide a new and highly efficient process for recovering gold, silver, copper, nickel, bismuth, tellurium, and cobalt from argillaceous and alkaline ores heretofore regarded as practically valueless, owing to the expense and difficulty involved in their working.

By my invention all values are extracted at a very moderate cost and within a reasonable time.

The invention will now be fully described, and hereinafter particularly set forth in the claims.

The ores are placed in a vat having a bottom of such porosity as to allow of filtration. They are first subjected to a bath of two-per-cent. solution of hydrocyanic acid for the purpose of extracting the gold and silver. In treating concentrates or other finely-ground ores I use a five-per-cent. alkaline solution or a solution of common potash with a two one-hundredth-per-cent. solution of copper sulfate for the purpose of preventing the ore from solidifying or packing, the solution of copper sulfate being first heated to 160° Fahrenheit. The ore in solution is then gently agitated by the introduction of free air heated before its introduction to 200° Fahrenheit. After such agitation has continued for a period of one hour a two-tenths-of-one-per-cent. solution of potassium cyanid is introduced into the solution and the agitation continued for two hours or until all chemical action ceases. During these steps filtration is constantly occurring into an outer vat through the porous bottom of the inner vat. The solution is then drawn off from the outer vat and allowed to percolate through a conical-shaped bed of charcoal, finely powdered and previously treated with a two-per-cent. solution of iron sulfate. To this cone are attached the positive and negative poles of an electric current by a storage battery of low voltage and high amperage. The electric current passing serves to precipitate the gold and silver upon the charcoal.

By the process herein described I am enabled to recover values from argillaceous and alkaline ores heretofore regarded as valueless or which involved such great expense in their working as to make the same inadvisable.

To enable the application of the invention to be fully understood, I have shown in the accompanying drawings an apparatus for carrying out my invention, Figure 1 being an enlarged view in vertical section of the two vats with the air-heater and pump and storage battery. Fig. 2 is an enlarged vertical sectional view of the carbon cone.

1 designates the inner vat; 2, its porous bottom; 3, the outer vat; 4, the pump; 5, the air-heater; 6, the outlet-pipe; 7, the carbon cone; 8, the storage battery; 9, the switch, and 10 the wires leading to the cone.

I claim as my invention—

1. The process herein described, of reducing low-grade refractory ores, such as argillaceous and alkaline ores, carrying gold, silver, copper, nickel, &c., which consists in subjecting the ores to a bath of hydrocyanic acid, agitating the mixture, then adding a solution of potassium cyanid and agitating until all chemical action ceases, and then separating the precious metals by electrodeposition, as set forth.

2. The process herein described, of reducing concentrates of argillaceous and alkaline ores carrying gold, silver, copper, nickel, &c., which consists in subjecting them to a bath of alkaline solution and a solution of copper sulfate, then agitating the mixture, then adding a solution of potassium cyanid and agitating until all chemical action ceases, and then separating the precious metals by electrodeposition, as set forth.

3. The process herein described of reducing argillaceous and alkaline ores carrying gold, silver, copper, nickel, &c., which consists in subjecting them to a bath of hydrocyanic acid, agitating the mixture with heated air, then adding a solution of potassium cyanid and further agitating by heated air until all chemical action ceases, as set forth.

4. A step in the described process of treating concentrates, containing precious metals, which consists in passing the solution containing the same through a bed of charcoal treated with a solution of iron sulfate, said bed being within an electric circuit and subjected to a current of high amperage and low voltage, thereby electrolytically depositing the precious metals, as set forth.

5. The process herein described of reducing argillaceous and alkaline ores which consists in subjecting them to a bath of hydrocyanic acid, agitating the mixture, adding a solution of potassium cyanid, further agitating and then filtering the mixture, and drawing off the solution into a bed of charcoal containing a solution of iron sulfate said bed being within an electric circuit and subjected to an electric current and thereby electrolytically depositing the precious metals, as set forth.

In testimony whereof I have signed this specification in the presence of two subscribing witnesses.

CHARLES H. GAGE.

Witnesses:
H. J. PENNEY,
GEO. P. GRIFFITH.